Patented Dec. 18, 1945

2,391,376

UNITED STATES PATENT OFFICE 2,391,376

MACHINABLE INSULATING COMPOSITION

Albert J. Monack, Rutherford, N. J., assignor to Mycalex Corporation of America, Passaic County, N. J., a corporation of New Jersey No Drawing. Application September 30, 1943, Serial No. 504,503

15 Claims. (Cl. 106—46)

The present invention is directed to electrical insulating compositions, more particularly, to compositions which are vitreous in character and which are capable of being worked mechanically.

For a number of years there has been on the market a material of this general character which is a glass bonded mica composition. This material has highly desirable electrical properties, including a relatively good dielectric constant. Such a composition is described and claimed in the patent to Wedlock No. 2,032,239, dated February 25, 1936.

The product described in said patent has found commercial use in the electrical field. However, in many cases it is desired to have a considerably higher dielectric constant than is provided by such a material. Usually, the material has a dielectric constant of about 6-6.5 and it is highly desirable to have a machinable insulating composition which has double or even higher dielectric constant.

Accordingly, it is one of the objects of the present invention to provide a material for insulating purposes which has a relatively high dielectric constant, which at the same time is strong and capable of resisting shocks, and which is adapted to be worked mechanically, as by cutting, machining and the like.

It is also among the objects of the present invention to provide a method of making a composition of the aforesaid character which is simple and effective and which is capable of providing a composition having the desired properties.

In practicing the present invention a composition is provided consisting essentially of a low melting glass frit which acts as a binder for the other constituents of the composition. There is also provided mica, in the powdered state, which is capable of imparting to the composition the desired machinability.

In such a mixture there is incorporated a titanium compound, usually titanium dioxide in crystalline form. Various titanates are also suitable. Certain titanium compounds, usually those amorphous in character, are unsuitable because they do not impart high dielectric constant to the composition. However, some such compounds when subjected to the conditions of treatment, become converted to such forms that they do impart high dielectric constants to the resulting compositions. Such materials are included in the present invention.

A mixture is made of the three finely divided ingredients, namely, glass frit, mica and titanium compound, in suitable proportions. The amounts of each of the ingredients may vary over wide limits and, in general, the higher the percentage of titanium dioxide or titanates, the greater is the dielectric constant of the resulting composition. To the mixture is added a relatively small amount of water or other liquid to temporarily bind the particles together and allow the materials to be formed into the desired shape.

Heating is applied to a sufficiently high temperature to soften the glass frit but not to melt the same. The glass is of such character that it softens below the temperature of dissociation of the mica. The heated material is pressed to the desired form and allowed to cool. The temperature reached is usually between 1100° and 1400° F.

The resulting material is ready for use and it may be worked mechanically in any of the usual ways, such as by sawing, drilling, tapping, slotting, planing, reaming, and any other machine operations which alter the size and shape of the material.

In general, the proportions of the materials used are as follows:

| | Per cent |
|---|---|
| Titanium compound | 10–60 |
| Mica | 10–50 |
| Frit | 30–40 |

The amount of water added is usually from 8–12% of the mixture. The relative proportions may be changed somewhat from those set forth above, with good results.

The products have numerous uses in the electrical industry. They may replace ordinary metallic and other resistors and capacitors. They may be used to give variable resistance or capacity by the use of slides in the usual manner. These products have the substantial advantage of being less subject to temperature changes than materials previously used for similar purposes.

Example 1

The following is a specific example of a composition made in accordance with the present invention:

| | Pounds |
|---|---|
| Pigment grade titanium dioxide | 10 |
| Mica | 24 |
| Frit (sodium-potassium borate) | 16 |
| Water | 4.5 |

The three solid constituents in finely divided form are intimately mixed and the water incorporated therein uniformly by vigorous stirring. The plastic mass is pressed in the cold and is dried at a low temperature to vaporize substantially all of the water from the mixture. The temperature of the mass is raised to a temperature of 1200°–1250° F. and compressed under a suitably high pressure in order to consolidate the material.

The time of heating is made as short as possible in order not to adversely affect the dielectric properties of the material. The molded composition is removed from the press and cooled slowly to prevent strains from being induced in the material. The outer surfaces are ground off to eliminate a skin which forms in the molding operation and dirt which may have worked into the surface. It is then ready for use and may be cut up into pieces of suitable size and machined as desired.

This composition has a dielectric constant of 12–16, as compared to less than half of the quantity for material made in accordance with prior art methods.

Example 2

The following composition may be made:

|  | Pounds |
| --- | --- |
| Calcium titanate | 20 |
| Mica | 12 |
| Frit (lead borate) | 18 |
| Water | 4 |

It is formed and treated in a manner similar to the composition of Example 1, to complete the product. The titanium compound is present in a considerably larger amount than in Example 1 and the dielectric constant is very substantially higher. The heating of the composition to prepare the same for the molding operation is at a substantially higher temperature, about 1275°–1325° F. Such a composition has a higher surface resistivity than one containing a lesser amount of the titanium compound.

The amount of titanium compound in the composition may be increased still further by the substitution of such compound for much of the mica present therein. Compositions containing as much as 75% of the titanium compound may be made, with the resulting corresponding increase in the dielectric constant. However, it is necessary to under-fire the material in order to obtain the desired properties. This may result in a relatively porous body. In such case, it may be impregnated with a molten wax of high insulating value or other suitable water-repellent material, and the composition allowed to cool to harden the wax.

It is highly desirable that the glass used shall dissolve a minimum of the titanium compound, as in such case, the dielectric constant is highest. Also, the time of heating should be the minimum necessary for raising the temperature to the softening point of the glass. The temperature should be the lowest, consistent with good manufacturing practice. Any glass having the desired characteristics may be used and the compositions described above are intended to illustrate and not to limit the types of glass which may be used.

Although the invention has been described by the use of two specific examples, many variations in the details may be made within the spirit of the invention. The titanium dioxide used may be of any grade, and the pigment grade is not essential to the invention. Various titanates such as those of the alkali earth metals or mixtures thereof may be used. Also, mixed titanates may be adapted for the purpose.

The mica may at least in part be replaced by other materials imparting machinability to the composition. Among such substances are various types of asbestos having similar properties, and the claims are intended to include such compositions. Instead of providing a preformed glass frit, the constituents thereof may be used and the materials heated to a sufficient temperature to form the glass and to bond the other constituents. Insead of mixing all of the ingredients in a single stage, several stages may be used and various orders of addition may be provided. Some of the steps of the operation may be combined with others or may even be eliminated. The proportions of the constituents may be varied to a considerable extent and other constituents may be added if desired, to suitably modify the properties of the composition. Instead of water as the temporary plasticizing agent, other liquids such as a solution of water glass may be used.

Instead of forming the insulating material by the heating and pressing operation and thereafter mechanically working the same to the desired shape, one may provide a mold and place the materials therein whereby by heat and pressure they may be formed into the final state in a single operation. In the above examples the glass frit was stated to be such that the heat merely softened the same to permit the consolidation of the material. This is preferable, but in some instances the temperature may be sufficiently high to cause melting of the glass in order to obtain the consolidated body.

These and other variations may be made in the details of the operation of the invention, as will be apparent to those skilled in the art. The invention is, therefore, to be broadly construed and not to be limited except by the character of the claims appended hereto.

What I claim is:

1. A machinable insulating composition comprising a finely divided crystalline substance having a high dielectric constant taken from the class consisting of titanium dioxide and titanates and mixtures thereof, intimately mixed with finely divided mica, said mixture being bonded by a glass frit which softens below the temperature of dissociation of mica, the amount of frit being about 30–40% of the composition and the titanium compound at least about 10% thereof, said titanium compound being held in crystalline form in said composition.

2. A machinable insulating composition comprising a finely divided crystalline alkali earth metal titanate intimately mixed with finely divided mica, said mixture being bonded by a glass frit which softens below the temperature of dissociation of mica, the amount of frit being about 30–40% of the composition and the titanium compound at least about 10% thereof, said titanium compound being held in crystalline form in said composition.

3. A machinable insulating composition comprising a finely divided crystalline substance having a high dielectric constant taken from the class consisting of titanium dioxide and titanates and mixtures thereof, intimately mixed with finely divided mica, the amount of mica being greater than that of said substance, said mixture being bonded by a glass frit which softens below the temperature of dissociation of mica, the amount of frit being about 30–40% of the composition and the titanium compound at least about 10% thereof, said titanium compound being held in crystalline form in said composition.

4. A machinable insulating composition comprising a finely divided crystalline substance having a high dielectric constant taken from the class consisting of titanium dioxide and titanates and mixtures thereof, intimately mixed with finely divided mica, the amount of said substance being about half of the mica present, said mixture being bonded by a glass frit which softens below the temperature of dissociation of mica, the amount of frit being about 30-40% of the composition and the titanium compound at least about 10% thereof, said titanium compound being held in crystalline form in said composition.

5. A machinable insulating composition comprising a finely divided crystalline substance having a high dielectric constant taken from the class consisting of titanium dioxide and titanates and mixtures thereof, intimately mixed with finely divided mica, said mixture being bonded by a borate glass frit which softens below the temperature of dissociation of mica, the amount of frit being about 30-40% of the composition and the titanium compound at least about 10% thereof, said titanium compound being held in crystalline form in said composition.

6. A machinable insulating composition comprising a finely divided crystalline substance having a high dielectric constant taken from the class consisting of titanium dioxide and titanates and mixtures thereof, intimately mixed with finely divided mica, said mixture being bonded by a glass frit which softens below the temperature of dissociation of mica, the ingredients being present in about the following proportions:

| | Per cent |
|---|---|
| Titanium compound | 10-60 |
| Mica | 10-50 |
| Frit | 30-40 |

7. A machinable insulating composition comprising a finely divided crystalline substance having a high dielectric constant taken from the class consisting of titanium dioxide and titanates and mixtures thereof, intimately mixed with finely divided mica, said mixture being bonded by a glass frit which softens below the temperature of dissociation of mica, said mixture having been heated above the softening point but not to the melting point of said glass and having been compressed while hot, the amount of frit being about 30-40% of the composition and the titanium compound at least about 10% thereof, said titanium compound being held in crystalline form in said composition.

8. A machinable insulating composition comprising a finely divided crystalline substance having a high dielectric constant taken from the class consisting of titanium dioxide and titanates and mixtures thereof, intimately mixed with finely divided mica, said mixture being bonded by a glass frit which softens below the temperature of dissociation of mica, the amount of frit being sufficient to bond all the particles of mica and titanium compound, the latter being in crystalline form and the mica being in plate form, the titanium compound being in substantial proportion but not over about 60% of said composition, said composition being coherent and machinable.

9. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, and heating said mixture to the softening point of said glass to produce a coherent mass.

10. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, adding a small amount of water sufficient to impart plasticity thereto, drying the same, and heating said mixture to the softening point of said glass to produce a coherent mass.

11. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, adding a small amount of water sufficient to impart plasticity thereto, drying the same, and heating said mixture to the softening point of said glass to produce a coherent mass, and pressing the same to the desired form at elevated temperature.

12. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, adding a small amount of water sufficient to impart plasticity thereto, cold pressing and drying the same, and heating said mixture to the softening point of said glass to produce a coherent mass.

13. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, and heating said mixture at a temperature of about 1100°-1400° F. for a relatively short time to produce a coherent mass.

14. A method of making a machinable insulating composition which comprises providing a finely divided crystalline substance having a high dielectric constant taken from the class consisting of titanium dioxide and titanates and mixtures thereof, mixing the same with finely divided mica, adding thereto a finely divided glass frit which softens below the temperature of dissociation of mica in an amount about 30-40% of the composition, and heating said mixture to the softening point of said glass to produce a coherent mass, and impregnating said product with an insulating material.

15. A machinable insulating composition comprising a finely divided crystalline substance having a high dielectric constant taken from the class consisting of titanium dioxide and titanates and mixtures thereof, intimately mixed with finely divided mica, said mixture being bonded by a glass frit which softens below the temperature of dissociation of mica, said composition being impregnated with a water-repellent wax of high insulating value, the amount of frit being about 30–40% of the composition and the titanium compound at least about 10% thereof, said titanium compound being held in crystalline form in said composition.

ALBERT J. MONACK.